United States Patent [19]

Yamamoto et al.

[11] 4,384,841
[45] May 24, 1983

[54] EXTRUSION DIE FOR EXTRUDING A HONEYCOMB STRUCTURE

[75] Inventors: Shinichi Yamamoto, Takahama; Fumitoshi Sakagami; Toshihiko Ito, both of Aichi, all of Japan

[73] Assignee: Nippon Soken, Inc., Nishio, Japan

[21] Appl. No.: 282,094

[22] Filed: Jul. 10, 1981

[30] Foreign Application Priority Data

Oct. 31, 1980 [JP] Japan ................................ 55-154450

[51] Int. Cl.³ .............................................. B29F 3/04
[52] U.S. Cl. ................................ 425/461; 264/177 R; 425/380; 425/465; 425/467
[58] Field of Search ...................... 425/467, 461–466, 425/197–199, 376 A, 376 R, 380; 264/177 R, 209.1, 209.8

[56] References Cited

U.S. PATENT DOCUMENTS

| | | | |
|---|---|---|---|
| 3,618,167 | 11/1971 | Brassard et al. | 425/461 |
| 3,790,654 | 2/1974 | Bagley | 264/177 R |
| 4,168,944 | 9/1979 | Morikawa et al. | 425/382 R |
| 4,243,370 | 1/1981 | Higuchi et al. | 425/467 |
| 4,278,412 | 7/1981 | Ozaki et al. | 425/198 |
| 4,298,328 | 11/1981 | Frost | 425/376 A |
| 4,298,564 | 11/1981 | Higuchi et al. | 264/177 R |
| 4,349,329 | 9/1982 | Naito et al. | 425/380 |

FOREIGN PATENT DOCUMENTS 1099519 1/1968 United Kingdom ................ 425/461

Primary Examiner—Jeffery R. Thurlow
Attorney, Agent, or Firm—Cushman, Darby & Cushman

[57] ABSTRACT

An extrusion die for extruding a honeycomb structure having a thick outer peripheral wall without generating any distortion or deformation therein, comprises a die body provided with a plurality of disconnected feed passageways and interconnected grid-shaped extrusion slots, an annular die mask which is closely contacted with the outer peripheral portion of the outlet face of the die body. In the outlet face of the die body, along the inner peripheral wall of the die mask, an annular groove of which depth is smaller than that of the extrusion slots is formed so as to open in the extruding direction.

6 Claims, 8 Drawing Figures

EXTRUSION DIE FOR EXTRUDING A HONEYCOMB STRUCTURE

BACKGROUND OF THE INVENTION

The present invention relates to an extrusion die for extruding a honeycomb structure, especially to an extrusion die for extruding a honeycomb structure having a thick outer peripheral wall.

The honeycomb structure for use as a catalyst support for purifying exhaust gases of a vehicle, or the like is composed of a large number of grid-shaped thin walls, and a large number of open passages separated by the thin walls.

The honeycomb structure having such a construction as described above is made of a fragile material such as ceramic so that the mechanical strength thereof becomes low.

In order to improve the mechanical strength, a thick outer peripheral wall is integrally formed on the peripheral surface of the honeycomb structure.

The conventional extrusion die for forming a honeycomb structure provided with such a thick outer peripheral wall as described above, is composed of a die body 1 and a die mask 2 which is disposed so as to be opposed to the outlet face of the die body 1. And between the outlet face of the die body 1 and the opposed end surface of the die mask 2, an annular opening portion 3 is formed as shown in FIGS. 1, 2 and 3.

The honeycomb structure provided with a thick outer peripheral wall is conventionally produced by the following steps.

(1) At first, the material to be extruded, is forcedly supplied into feed passageways 4 which are disconnectedly formed on the inlet side of the die body 1.

(2) Then, the material flows into interconnected grid-shaped extrusion slots 5 having the cross sectional shape conforming to that of the honeycomb structure, which are formed on the outlet side of the die body 1 so as to be communicated with the feed passageways 4 within the die body 1, and the material moves straightly within the extrusion slots while being laterally spread therewithin so as to become a coherent grid-shaped body.

(3) Finally, the material straightly moving through the extrusion slots 4 situated in the central portion of the die body 1 is extruded out of the die body 1 into the inside of the die mask 2 and is formed into a honeycomb structure, and the material extruded into the opening portion 3 inwardly moves to crush open passages formed in the outer peripheral portion of the honeycomb structure which is extruded out of the central extrusion slots to integrally form a thick outer peripheral wall about the honeycomb structure.

However, since the peripheral portion of the honeycomb structure which is extruded out of the central extrusion slots 5 is crushed by the material extruded into the opening portion 3, distortion is produced in the outer peripheral portion of the obtained honeycomb structure in the final step (3) as described above.

Therefore, when the obtained honeycomb structure is dried and fired and when the obtained product is used, cracks are apt to be generated in the outer peripheral portion thereof.

And when the honeycomb structure provided with very thin walls is extruded, the thin walls adjacent to the thick outer wall are apt to be deformed due to the pressure applied by the material extruded into the opening portion 3 in the final step (3) as described above.

Accordingly, one object of the present invention is to provide an extrusion die for extruding a honeycomb structure provided with a thick outer peripheral wall and having excellent mechanical strength.

Another object of the present invention is to provide an extrusion die by which a thick outer peripheral wall can be integrally formed about the outer peripheral portion of a honeycomb structure without generating any distortion therein.

Still another object of the present invention is to provide an extrusion die suitable for extruding a catalyst support for purifying exhaust gases, which is composed of a large number of narrow open passages separated by thin partition walls, and a thick outer peripheral wall integrally formed on the outer periphery thereof, and which has excellent strength.

DESCRIPTION OF THE DRAWINGS

Other objects and advantages of the invention will become apparent from the following description of embodiments with reference to the accompanying drawings wherein.

SUMMARY OF THE INVENTION

According to the present invention, the outer peripheral portion of an outlet face of a die body is covered by an annular end surface of a die mask which is closely contacted therewith. An annular shallow groove is formed at least partially if not fully inside of the covered outer peripheral portion of the outlet face of the die body along the end of an inner peripheral wall of the die mask so as to open in the extruding direction.

When the honeycomb structure is extruded by the extrusion die of the present invention, the material flows into the annular groove from the extrusion slots outside of the groove so that the groove is charged with the material. The charged material is extruded along the inner peripheral wall of the die mask to form a thick outer wall about the extruded honeycomb structure.

Therefore, according to the present invention, since pressure is not laterally applied into the outer periphery of the extruded honeycomb structure by the material used for forming a thick outer wall on the extruded honeycomb structure, no distortion is generated in the outer wall of the obtained honeycomb structure or no deformation is produced in the walls defining the open passages.

Furthermore, the material which moves through the extrusion slots outside of the annular groove in the extruding direction is also supplied to the extrusion slots inside of the groove through the laterally extending extrusion slots. Therefore, shortage of the material can be prevented from occurring in the extrusion slots adjacent to the groove so that there can be obtained a honeycomb structure having an integral outer wall with excellent mechanical strength.

DETAILED DESCRIPTION OF THE INVENTION

Hereinafter, the present invention will be explained in detail in accordance with several embodiments with reference to accompanying drawings.

Figure 1:
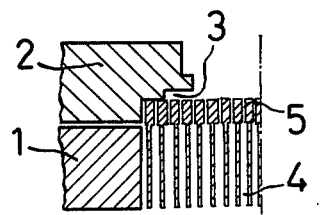
FIG. 1 to FIG. 3 are sectional views of the conventional extrusion dies.
Figure 2:
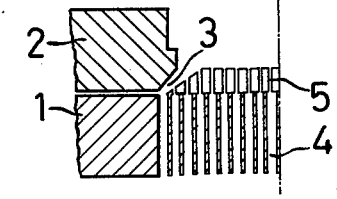
Figure 3:
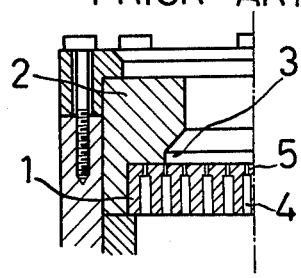
Figure 4:
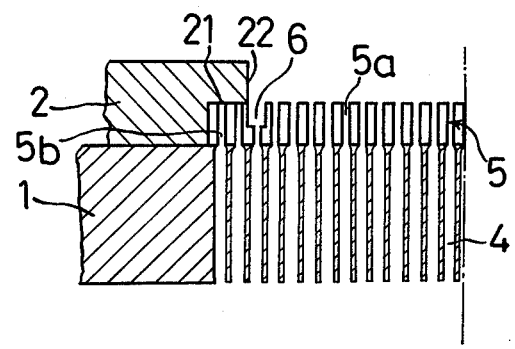
FIG. 4 is a sectional view of an extrusion die of a first embodiment of the present invention.
Figure 5:
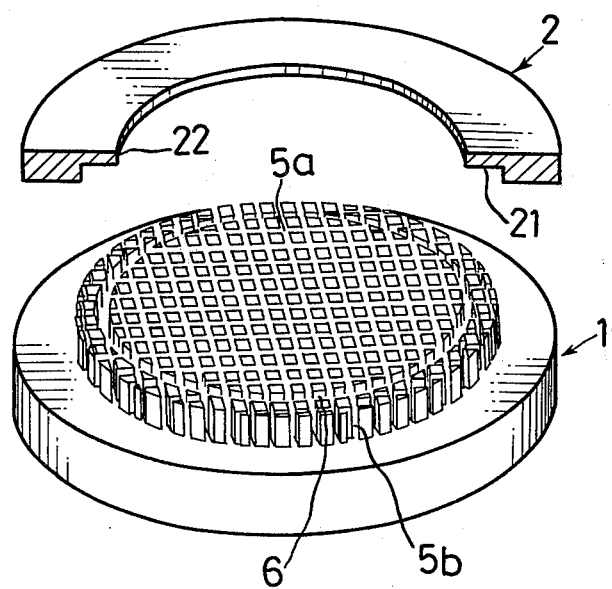
FIG. 5 is an exploded perspective view of FIG. 4.

FIG. 4 and FIG. 5 show a first embodiment. In the first embodiment, a die body 1 is provided with extrusion slots 5 on the outlet side thereof and feed passageways 4 on the inlet side thereof. The extrusion slots 5 have a grid-shaped cross section and are interconnected with one another. Each feed passageway 4 has a disconnected circular cross section and are communicated with each intersection of the grid-shaped extrusion slots 5. A die mask 2 is of an annular shape, and on an inner peripheral wall 22 of the die mask 2, an annular stepped portion is formed. The outer peripheral portion of the outlet face of the die body 1 is covered by an end surface 21 of the annular stepped portion of the die mask 2 so as to close the extrusion slots formed therein.

On the outlet side of the die body 1, an annular shallow groove 6 opening in the extrusion direction, is formed. The width of the bottom surface of the groove 6 is equal to that of the opening thereof and the depth of the groove 6 is smaller than that of each extrusion slot 5.

In this embodiment the outer peripheral wall of the groove 6 extends on the same plane as that of the inner peripheral wall 22 of the stepped portion of the die mask 2.

The die body 1 and the die mask 2 are connected by bolts (not shown).

Hereinafter, the process of extruding a honeycomb structure by means of the above described extrusion device will be explained.

The first step wherein a material is forcedly supplied into the feed passageways 4 formed on the inlet side of the die body 1 and the second step wherein the material straightly moves through the extrusion slots in the extrusion direction while being laterally spread within the extrusion slots, are the same as those of the conventional dies.

In the third step, the material moving through the extrusion slots 5b situated in the outer peripheral portion of the die body 1 is prevented from being extruded out of the extrusion slots 5b by the end surface 21 of the die mask 2 and laterally moves and flows into the groove 6. One portion of the material moving through the extrusion slots 5b laterally moves and flows into the extrusion slots inside of the groove 6. Therefore, shortage of the material can be prevented from occurring in the boundary portion between the groove 6 and the extrusion slots 5a. The material charges within the groove 6 is extruded out of the groove 6 so as to be integrally joined with the honeycomb structure extruded out of the extrusion slots 5a.

Consequently, about the outer periphery of the honeycomb structure extruded out of the extrusion slots 5a, an outer peripheral wall is integrally formed by the material extruded out of the groove 6. The thickness of the outer peripheral wall corresponds to the width of the opening of the groove 6.

Figure 8:
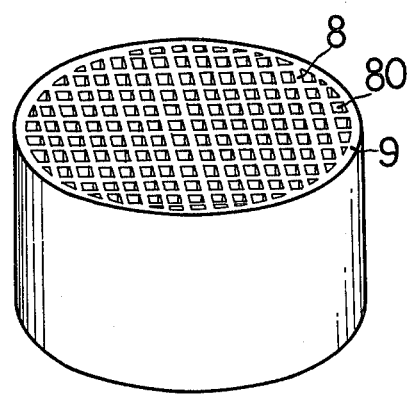
FIG. 8 is a perspective view of a honeycomb structure of the present invention.

FIG. 8 shows a honeycomb structure which is obtained by means of the extrusion die of the present invention. The honeycomb structure of FIG. 8 is provided with a large number of open passages 80 which are separated by grid-shaped thin walls 8 having a cross sectional shape conforming to that of the extrusion slots 5 and on the outer periphery of the honeycomb structure, a thick outer wall 9 is integrally formed.

When the honeycomb structure as shown in FIG. 8 is extruded by means of the extrusion die of the present invention, into the outer periphery thereof, no lateral pressure is applied after being extruded out of the die body 1. Therefore, no distortion is produced in the outer peripheral wall 9 of the obtained honeycomb structure and no deformation is produced in the thin walls adjacent to the outer peripheral wall 9.

The inner peripheral wall 22 of the die mask 2 may be formed into a tapered surface, of which the diameter is enlarged in the extruding direction.

Figure 6:
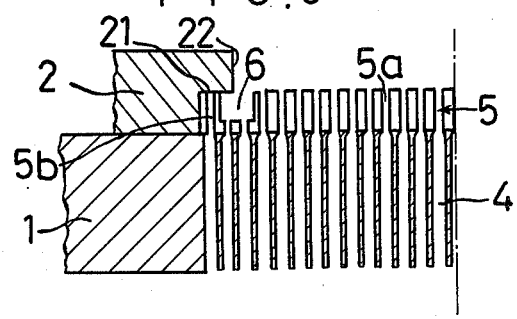
FIG. 6 and FIG. 7 are sectional views of an extrusion dies of a second and a third embodiments of the presnet invention.

FIG. 6 shows a second embodiment of the present invention.

In the extrusion die of the second embodiment, the width of the groove 6 is made larger than the desired thickness of the outer peripheral wall of the obtained honeycomb structure and the end surface 21 of the die mask 2 covers one portion of the opening of the groove 6 on the outer side thereof.

Otherwise, the construction of the second embodiment is substantially equal to that of the first embodiment.

According to the second embodiment, by interchanging the die mask with another die mask having a different inner diameter, the thickness of the outer perpipheral wall of the obtained honeycomb structure can be changed.

Figure 7:
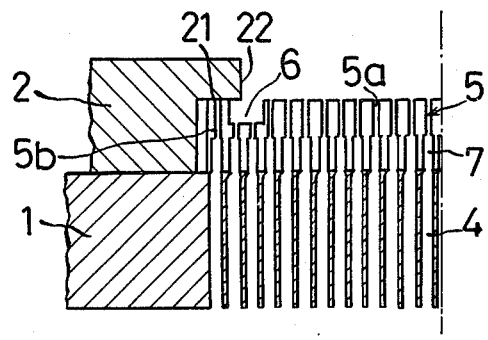

FIG. 7 shows a third embodiment of the present invention.

In the extrusion die of the third embodiment, grid-shaped pooling slots 7 of which width is larger than that of the extrusion slots 5, are formed in the connecting portion of the feed passageways 4 and the extrusion slots 5.

The material supplied from the feed passageways 4 moves into the pooling slots and then forcibly flows into the extrusion slots 5.

Otherwise, the construction of the third embodiment is substantially equal to that of the second embodiment.

As is apparent from the third embodiment, the present invention can be applied to different types of extrusion dies.

As described above, according to the present invention, since a thick outer peripheral wall is formed before the material is extruded from the outlet face of the die body, a honeycomb structure provided with a thick outer peripheral wall which is integrally formed about the outer periphery thereof for the sake of reinforcement can be formed without generating any distortion in the outer peripheral wall which is integrally formed about the outer periphery thereof and without deforming the grid-shaped thin walls adjacent to the outer peripheral wall.

Having now fully described the invention, it will be apparent to one of ordinary skill in the art that many changes and modifications can be made thereto without departing from the spirit or scope of the invention as set forth herein.

What is claimed is:

1. An extrusion die for extruding a honeycomb structure, comprising:
   a die body provided with interconnected grid-shaped extrusion slots having a predetermined depth which are formed on the outlet side thereof, and a plurality of disconnected feed passageways, which are formed on the inlet side thereof so as to be communicated with said extrusion slots therewithin;

an annular die mask having an axially extending inner peripheral wall for defining the outer wall of said honeycomb structure and having an annular end surface extending radially outwardly from said wall and at least partially in its radial extent being in close contact with an outer peripheral portion of said outlet side of said die body for closing extrusion slots which open in said outer peripheral portion and leaving open those radially inward thereof;

said die body being provided with an annular groove formed radially inwardly of said outer peripheral portion of said outlet side along the inner peripheral wall of said die mask so as to open in the extruding direction; and said annular groove having a depth smaller than said predetermined depth of said extrusion slots and a width larger than that of said extrusion slots.

2. An extrusion die according to claim 1, wherein: the outer peripheral wall of said annular groove extends on the same axial plane as that of said inner peripheral wall of said die mask.

3. An extrusion die according to claim 1, wherein: said die mask covers the outer peripheral portion of the opening of said annular groove throughout the circumference thereof by a predetermined width.

4. An extrusion die according to claim 1, wherein: said annular groove has an equal width in the radial direction of said die body from the bottom portion to the opening portion thereof.

5. An extrusion die as in claim 1, wherein: said inner peripheral wall of said die mask intersects said annular end surface thereof at a right angle and extends therefrom in the extruding direction.

6. An extrusion die according to claim 1, 2, 3, 4 or 5 wherein:
said die body is further provided with interconnected grid-shaped pooling slots which are formed in the portion wherein said feed passageways are communicated with said extrusion slots; and
said pooling slots have a width smaller than that of said feed passageways and larger than that of said extrusion slots and are formed so as to be superposed on said extrusion slots.

* * * * *